United States Patent [19]

Martin et al.

[11] 3,911,077

[45] Oct. 7, 1975

[54] TUNGSTEN RECOVERY FROM TUNGSTEN ORE CONCENTRATES BY CAUSTIC BAKING

[75] Inventors: Brice E. Martin; Joseph E. Ritsko, both of Towanda, Pa.; Robert E. Long, Jr., Williamstown, N.J.

[73] Assignee: GTE Sylvania Incorporated, Stamford, Conn.

[22] Filed: Sept. 3, 1974

[21] Appl. No.: 502,858

[52] U.S. Cl. .................. 423/58; 423/61; 423/593
[51] Int. Cl.² ........................................ C01G 41/00
[58] Field of Search ............... 423/55, 58, 61, 593; 75/101 R

[56] References Cited
UNITED STATES PATENTS

| | | | |
|---|---|---|---|
| 1,335,277 | 3/1920 | DeGolyer et al. | 423/58 |
| 1,388,857 | 8/1921 | Giles et al. | 423/58 |
| 2,316,583 | 4/1943 | Highriter et al. | 423/55 |
| 2,339,888 | 1/1944 | Smith | 423/58 |
| 2,459,868 | 1/1949 | Burnwell et al. | 423/58 |

*Primary Examiner*—Herbert T. Carter
*Attorney, Agent, or Firm*—Norman J. O'Malley; John C. Fox; Donald R. Castle

[57] ABSTRACT

Tungsten is recovered from scheelite ore concentrates, or other tungsten concentrates which may, or may not contain scheelite in the form of sodium tungstate and in yields up to 99.5 percent or more by a process in which ground ore substantially below 200 mesh in particle size is first added to a 50 percent sodium hydroxide solution while being agitated to such an extent that the resulting mixture becomes a semisolid as the temperature is raised above 80°C. The semi-solid is then baked at 135 to 145°C for about 1 to 2 hours, followed by adding sufficient water to the semi-solid to form a slurry having a sodium hydroxide concentration below 6 molar, separating the causticinsoluble sludge from the slurry and washing the sludge with a dilute sodium hydroxide solution to remove residual sodium tungstate.

7 Claims, No Drawings

TUNGSTEN RECOVERY FROM TUNGSTEN ORE CONCENTRATES BY CAUSTIC BAKING

BACKGROUND OF THE INVENTION

This invention relates to an improvement in a process to recover tungsten in a useable form and in high yields from scheelite ore concentrates, or other tungsten ore concentrates which may, or may not, contain scheelite.

It is the practice to process scheelite concentrates ($CaWO_4$) or other tungsten ores which contain scheelite by one of the following four conventional methods: Acid decomposition, sodium carbonate digestion in autoclaves, fusion with sodium carbonate, and caustic digestion.

In acid decomposition, hydrochloric acid is normally employed to react with the calcium tungstate to produce tungstic acid and calcium chloride. Disadvantages of this method include a high consumption of hydrochloric acid (typically from one and a half to three moles of hydrochloric acid in excess of the stoichiometric amount are required), and yields only up to about 95 percent. Furthermore, since removal of molybdenum as an impurity initially requires a basic pH, acid decomposition is in general a more expensive process than basic processes for ores containing undesirably high molybdenum levels.

Sodium carbonate digestion in an autoclave produces soluble sodium tungstate and insoluble calcium carbonate. Disadvantages of this method include a relatively high consumption of sodium carbonate, and operation at elevated temperature and pressure (typically from 180°C to 200°C at 15 atmospheres).

Fusion with sodium carbonate involves the addition of sodium carbonate and silion dioxide to the scheelite ore concentrate and reaction to produce soluble sodium tungstate, insoluble calcium silicate and carbon dioxide gas. Disadvantages of this technique are a large consumption of sodium carbonate, very high temperatures (above 1,000°C) requiring expensive refractory materials, and the necessity for close control of the blend and temperature of reactants to obtain molten material which will flow from the reaction vessel.

U.S. Pat. No. 3,800,025 describes a lower temperature process applicable to low grade tungsten ores involving roasting in the presence of sodium carbonate of sodium phosphate and sodium chloride at between 600°C and 900°C, followed by leaching and filtering. However, this process results in yields only up to about 85 percent.

Caustic soda digestion involves the reaction of calcium tungstate and sodium hydroxide to obtain soluble sodium tungstate and insoluble calcium hydroxide according to the following reaction: $CaWO_4 + 2NaOH \rightleftarrows Na_2WO_4 + Ca(OH)_2$. In general this technique is characterized by high caustic requirements and poor yields of extracted tungsten values. For example, in one reported experiment as much as 4.4 grams of sodium hydroxide per gram of tungsten (18 moles in excess of the stoichiometric amount required) yielded only 86.3 percent of tungsten from a scheelite ore concentrate. Canadian Mining and Metallurgical Bulletin, December 1966, pages 14–19. In U.S. Pat. No. 2,339,888 use of from 3 to 5 times the stoichiometric amount of NaOH during digestion, followed by leaching and various purification steps yielded about 93 percent of W from a scheelite ore concentrate.

SUMMARY OF THE INVENTION

In accordance with the invention, tungsten is recovered in high yields in the form of soluble sodium tungstate when tungsten ore concentrates which may, or may not, contain various amounts of scheelite, are subjected to a process in which ore, ground to an appropriate size range, are added to a solution of sodium hydroxide having a concentration of at least 10 molar in an amount to form a semi-solid, too viscous to stir, when heated above about 80°C. The solid is then baked at a temperature of from about 90°C to 150°C for a time sufficient to achieve a moisture level of the solid from about 10 to 25 percent and to convert substantially all of the insoluble calcium tungstate and any other tungstates to soluble sodium tungstate followed by leaching by adding sufficient water to form a slurry of sodium hydroxide leach solution having a concentration below 6 molar and solids, thereby to achieve substantially complete solubility of the sodium tungstate, and separating the leach solution from the causticinsoluble sludge before substantial reformation of insoluble tungstates from sodium tungstate and calcium hydroxide and/or other hydroxides.

Under preferred conditions to be described herein, which may include one or more optional washing steps to remove residual sodium tungstate from the sludge, up to 99.5 percent or more of the original tungsten values in the ore may be recovered as sodium tungstate, regardless of the percent of recoverable tungsten present in the ore.

In another aspect of the invention the sodium tungstate leach solution is evaporated to a volume to achieve crystallization of the sodium tungstate. The excess sodium hydroxide solution is then removed, for example by decantation or filtration, concentrated, and recycled to digest the next batch of tungsten ore concentrate. Approximately 75 percent of the excess sodium hydroxide can be recycled in this manner.

In still another aspect of the invention, the sodium tungstate crystals recovered are dissolved in water to a desired concentration and the solution is then ready for further purification by practices generally known in the art to achieve, for example, silicon and molybdenum removal. Further in accordance with the practice in the art, the purified sodium tungstate solution may be further processed such as by liquid extraction techniques to convert sodium tungstate to one or more ammonium tungstate species.

DETAILED DESCRIPTION OF THE INVENTION

While the particle size of the ore concentrate is not a critical aspect of the invention, nevertheless it has been found that smaller particle sizes shorten baking and leaching times, and also result in optimum yields of tungstate values extracted. For this purpose particle sizes substantially below 200 mesh (standard U.S. sieve) are preferred. Further reductions in processing time and/or increases in yields for smaller particle sizes, for example, below 325 mesh, are in general outweighed by the difficulty in achieving such smaller particle sizes on a commercial scale.

While discussion herein will generally be in terms of converting insoluble calcium tungstate to soluble sodium tungstate and insoluble calcium hydroxide, it is to be understood that other insoluble tungstates which may be present in the ore, such as iron and manganese tungstates, may also be converted to sodium tungstate and insoluble hydroxides by similar reactions. Furthermore, while not preferred due to their cost, other alkali metal hydroxides in addition to sodium hydroxide, such as lithium and potassium hydroxides may be used in the practice of the invention.

The concentration of the sodium hydroxide is critical to both the baking step and the leaching step, in order to achieve the improved yields which are a particular advantage of the invention. The concentration of the solution used to form the semi-solid for baking should be at least 10 molar below which the efficiency of formation of sodium tungstate from calcium tungstate and sodium hydroxide during baking it too low. While there is no upper limit to the concentration of this solution, concentrations above 20 molar may require excessive volumes of water for subsequent slurry formation. Based upon these considerations, a concentration of at least about 15 molar of NaOH is preferred.

In order to achieve a semi-solid for baking, and thus an optimum amount of tungsten compound recovered per unit of NaOH consumed, the sodium hydroxide should be present in an amount below about 6 moles of NaOH per mole of W. While the efficiency of recovery tends to drop exponentially with decreasing NaOH, as little as 3 moles of NaOH per mole of W will enable about 85 percent yield. It is preferred to maintain a mole ratio of NaOH to W of about 4 to 6 in order to achieve yields of 98% or greater.

Baking time and temperature should be consistent with maintaining a moisture level in the semi-solid of from about 10 to 25 percent, above which the conversion to $Na_2WO_4$ is incomplete and below which the semi-solid becomes a hard solid containing insoluble tungstates. This hard solid must then be pulverized before the desired moisture level can be reestablished.

The baking temperature may be from about 90°C to 150°C, below which time to reach the desired moisture level becomes excessive and above which sufficient moisture cannot be retained during required baking times. It is preferred to bake at about 130 to 145°C in order to achieve an optimum through-put per unit of time. Where the particle size of the ore concentrate is substantially below 200 mesh, baking is usually substantially complete after about 1 hour at the highest temperatures and about 2 hours at the lowest temperatures. Baking times in excess of about 4 hours and preferably in excess of about 3 hours, should be avoided in that such times lead to decreased moisture level and decreased efficiency of the process.

Following baking, water is added to the semi-solid in an amount sufficient to reform a slurry of solids in sodium hydroxide leach solution having a concentration of sodium hydroxide at which the sodium tungstate formed is substantially completely soluble, that is, to a concentration below about 6 molar. While further dilution in general tends to increase the solubility of sodium tungstate in the leach solution, extreme dilution should in general be avoided since it tends to cause reversal of the reaction and reformation of insoluble calcium tungstate. This tendency to reversal with decreasing concentration of sodium hydroxide decreases with decreasing temperature of the solution. For example, while at a solution temperature of about 90°C reversal may occur within about four hours at a concentration of 3.5 molar, at a solution temperature of about 22°C substantially no reversal occurs within this time period at a concentration of about two molar. In general, a dilution to within a range of 4.5 to 5.5 molar concentration of sodium hydroxide allows up to about 28 hours at 80°C to 90°C before substantial reaction reversal begins. This is often advantageous in production operations where equipment for separation of the leach solution from the sludge, (such as by filtration or decantation) is often not immediately available. Of course, it will be appreciated that after separation by filtration or decantation has been effected, the reversal problem is obviated. However, even where such separation may be carried out within a short time following leaching, it may be desirable to limit the extent of dilution of the leach solution where such solution is to be reconcentrated and recycled for baking as described herein.

Depending upon the character of the ore concentrate and the processing conditions, the efficiency of recovery or yield may be significantly increased by washing the caustic insoluble sludge to remove residual sodium tungstate. Such washing is typically carried out using water or a dilute solution of sodium hydroxide. However it will be appreciated that the same considerations regarding solubility in the leach solution and reaction reversal which apply to dilution of the leach solution also apply to washing of the sludge. For example, for a water wash to be effective, filtering should follow immediately, that is, at least within about 5 minutes.

EXAMPLE I

A scheelite concentrate, previously pulversized so greater than 98% passed through 200 mesh, is assayed at 13.7% Ca, 70.4% $WO_3$, 1.7% $SiO_2$, 0.9% Fe, 0.1% Mn, and 2.0% Mo.

A 227 g sample of this concentrate, containing 160 g $WO_3$, is added slowly to a 150 ml volume of 50% NaOH which is being agitated. After all of the concentrate is added, the mixture is heated. As the temperature of the reactants rise above 80°C and approach 100°C, the material becomes thicker and within a few minutes becomes a semi-solid paste, too thick to stir. The material is transferred to an oven at an oven temperature of 140°C and allowed to bake for 3 hours. The moisture level of the baked mass is approximately 20% with the inside temperature of the baked material approximately 124°C. The material is cooled to room temperature and 500 ml of $H_2O$ added for leaching the $Na_2WO_4$. After leaching, the insolubles are removed by filtration within 30 – 5 minutes and washed with either hot water or hot 0.5M NaOH. The insolubles contain <0.5% of the original $WO_3$.

EXAMPLE II

A tungsten concentrate, previously pulverized so that greater than 98% passed through 200 mesh, is assayed at 2.2% Ca, 58.3% WO, 10.2% Fe, 1.4%Mn, 0.4% Mo, and 12% $SiO_2$.

A 273 g sample of the above concentrate, containing 160 g $WO_3$, is added slowly to 150 ml of 50% NaOH which is being agitated. The same technique as for Example I is used and the insoluble material contains <0.4% of the original $WO_3$. The leach solution is assayed 175 g $WO_3$/liter and represents 99.5% of the original $WO_3$.

EXAMPLE III

Evaluation of other scheelite concentrates is carried out using the procedure of Example I except that the baked material is diluted with 600 mls of water, and filtered within 30±5 minutes. Results are shown below in Table I.

TABLE I

| Ore Sample No. | Assay (%) by wt. | | | | | | Ore Wt. (g) | WO₃ (g) | % of Orig. WO₃ | | | |
| --- | --- | --- | --- | --- | --- | --- | --- | --- | --- | --- | --- | --- |
| | Ca | WO₃ | Fe | Mn | Mo | SiO₂ | | | In Sludge | In Leach | Re-Leach | Total Acc'd For |
| 1 | 13.7 | 70.4 | .9 | .14 | 2 | 1.7 | 227 | 160 | .49 | 97.1 | — | 97.6 |
| 2 | 13.6 | 70.4 | .9 | .14 | 2 | 1.7 | 227 | 160 | .45 | 98.8 | — | 99.25 |
| 3 | 12.4 | 72.4 | .6 | .05 | 2.5 | .7 | 221 | 160 | .6 | 97.1 | — | 97.7 |
| 4 | 14.2 | 78.4 | .4 | .02 | .05 | .5 | 204 | 160 | .84 | 99 | — | 99.8 |
| 5 | 2.2 | 58.3 | 10.2 | 1.4 | .04 | 12 | 273 | 160 | <.4 | 99.5 | — | 99.5 |
| 6 | 11 | 41 | 9.9 | — | .8 | 4.9 | 390 | 160 | 11.5 | 93.3 | 2.6 | 107.4 |
| 7 | 3.2 | 61 | 11.4 | 1.4 | .02 | 11.9 | 262 | 160 | <.35 | 92.8 | 4.6 | 97.4 |
| 8 | 9.4 | 63.9 | 5.7 | .13 | — | 2.8 | 250 | 160 | 4.0 | 93.2 | 2.2 | 99.4 |
| 9 | 13.9 | 80.6 | — | — | — | — | 200 | 160 | .17 | — | — | — |

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for recovering soluble sodium tungstate from tungsten ore concentrates comprising leaching the concentrate in sodium hydroxide solution to produce soluble tungstate and caustic insoluble calcium hydroxide-containing sludge, diluting the leach solution with water, separating the leach solution from the sludge, and crystallizing the sodium tungstate from the solution, wherein the improvement comprises:

1. carrying out leaching by first baking a semi-solid mixture of the concentrate in sodium hydroxide solution having a concentration of at least 10 molar at a temperature of from 90°C to 150°C to a moisture level of from 10 to 25 percent to convert substantially all of the insoluble tungstates to sodium tungstate, followed by adding sufficient water to the semi-solid to form a slurry of solids in sodium hydroxide leach solution having a concentration below about 6 molar and to achieve substantially complete solubility of sodium tungstate therein, and 2. separating the leach solution from the sludge prior to the time when substantial reversal of the reaction and reformation of insoluble tungstates begins to occur.

2. The method of claim 1 in which the concentration of the leach solution formed by the addition of water to the semi-solid is below 4.5 molar and is adjusted to within the range of about 4.5 to 5.5 molar by the addition of sodium hydroxide thereto.

3. The method of claim 1 in which the ore concentrate is added to the leach solution in an amount to achieve a mole ratio of from about 4 to 6 moles of sodium hydroxide per mole of tungsten.

4. The method of claim 1 in which the ore concentrate is ground to substantially below 200 mesh particle size, and in which baking is carried out for from about 1 to 4 hours.

5. The method of claim 4 in which baking is carried out at a temperature of from about 130° to 145°C.

6. The method of claim 1 in which the sludge is washed with a solution containing from 0 to 6 molar concentration of sodium hydroxide to remove residual sodium tungstate.

7. The method of claim 1 in which following crystallization of the sodium tungstate, the excess sodium hydroxide solution is separated therefrom and concentrated and recycled to the baking of a new ore concentrate.

* * * * *